United States Patent [19]

Muto et al.

[11] Patent Number: 4,495,790
[45] Date of Patent: Jan. 29, 1985

[54] METHOD FOR MANUFACTURING VALVE GUIDE FOR A HYDRAULIC DAMPER

[75] Inventors: Toshiaki Muto; Akio Goto, both of Kanagawa, Japan

[73] Assignee: Tokico Ltd., Kanagawa, Japan

[21] Appl. No.: 399,133

[22] Filed: Jul. 16, 1982

[30] Foreign Application Priority Data

Jul. 20, 1981 [JP] Japan .......................... 56-107479[U]
Aug. 18, 1981 [JP] Japan ............................... 56-129180
Aug. 18, 1981 [JP] Japan ............................... 56-129181

[51] Int. Cl.³ .............................................. B21D 53/10
[52] U.S. Cl. ....................................... 72/326; 72/348; 188/322.14
[58] Field of Search ................. 72/325, 326, 348, 368, 72/370, 379; 188/322.14; 29/148.4 C, 149.5 C

[56] References Cited

U.S. PATENT DOCUMENTS

| | | | |
|---|---|---|---|
| 624,047 | 5/1899 | Keiper | 29/148.4 C |
| 3,206,967 | 9/1965 | Holton | 72/325 |
| 3,859,942 | 1/1975 | Moller | 72/348 |
| 4,418,471 | 12/1983 | Torii et al. | 72/348 |

Primary Examiner—Lowell A. Larson
Attorney, Agent, or Firm—Wenderoth, Lind & Ponack

[57] ABSTRACT

A hydraulic damper includes a cylinder, a piston slidably disposed in the cylinder and partitioning the interior of the cylinder into first and second oil chambers, a rod secured to the piston and extending through the first chamber to the outside, and a damping force generating valve mechanism provided in the cylinder and at one end of the second oil chamber. The valve mechanism comprises a bottom member defining an annular valve seat thereon, a flexible valve disc cooperating with the valve seat, and a novel generally tubular valve guide. The valve guide has a plurality of large and small diameter portions formed integrally and alternately along the circumference thereof, the inner circumference of the small diameter portions defining guide surfaces for guiding the outer circumference of the valve disc and axial passages along the outer circumference thereof, and the large diameter portions defining axial passages along the inner circumference thereof and which passages communicate with the first mentioned axial passages through cut-outs formed between the large and small diameter portions.

2 Claims, 36 Drawing Figures

METHOD FOR MANUFACTURING VALVE GUIDE FOR A HYDRAULIC DAMPER

BACKGROUND OF THE INVENTION

This invention relates to a hydraulic damper and particularly to improvements in methods of manufacuure of a valve mechanism in the hydraulic damper.

One prior art hydraulic damper comprises a cylinder, a piston slidably disposed in the cylinder and partitioning the interior of the cylinder into first and second oil chambers, a piston rod secured to the piston and extending through the first oil chamber to the outside, a first damping force generating valve mechanism provided in the second oil chamber to control the oil flow between the second oil chamber and a reservoir chamber, and a second damping force generating mechanism mounted on the piston for generating a damping force in the extension stroke of the damper. The first damping force generating mechanism generates a damping force in the contraction stroke of the damper.

The first damping force generating mechanism typically comprises an annular disc or a valve member, an annular valve seat formed on a bottom member connected to one end of the cylinder, a spring biasing the valve member toward the valve seat, and a retainer supporting the spring and being mounted on the bottom member. For reliably mounting the retainer on the bottom member, the retainer usually has a generally hat shaped configuration having on one end a radially outwardly extending flange clamped axially between the cylinder and the bottom member, and on the upper end an aperture for permitting the liquid to flow therethrough. Further, there has been provided between the outer circumference of the valve member and the inner circumference of the retainer a valve guide having a plurality of angularly spaced and axially extending guide portions for slidably engaging with and supporting the outer circumference of the valve member. The valve guide is also retained by the retainer. However, it has been difficult to form a sufficient passage area for the oil flow, particularly between the upper end portions of the retainer and the valve guide. Further, since the valve guide and the retainer are separate parts, the manufacturing and assembling process are complicated.

SUMMARY OF THE INVENTION

An object of the invention is to avoid the shortcomings aforementioned and, the hydraulic damper manufactured according to the invention is of the kind including a cylinder, a piston slidably disposed in the cylinder and partitioning the interior of the cylinder into first and second oil chambers, a rod secured to the piston and extending through the first chamber to the outside, and a damping force generating valve mechanism provided in the cylinder and at one end of the second oil chamber remote from the first oil chamber. The valve mechanism comprises a bottom member defining an annular valve seat thereon, a flexible valve disc cooperating with the valve seat, a generally tubular novel valve guide with a plurality of large and small diameter portions formed integrally and alternately around the circumference thereof, the inner circumference of the small diameter portions defining guide surfaces for guiding the outer circumference of the valve disc and axial passages along the outer circumference thereof, and the large diameter portions defining axial passages along the inner circumference thereof and which passages communicate with the first mentioned axial passages through cut-outs which are formed between the large and small diameter portions.

Another object of the invention is to provide a method for manufacturing the novel valve guide by steps of

- stamping or drawing a sheet metal member into a generally hat-shaped configuration having an upper end wall, a cylindrical wall and a flange extending radially outwards from the lower end of the cylindrical wall,
- cutting and die-forming a plurality of circumferentially spaced portions of the upper end wall and the cylindrical wall to form a plurality of circumferentially spaced small or large diameter cylindrical portions and a plurality of cut-outs defined between the small or large diameter cylindrical portions and remaining portions of the cylindrical wall, and
- punching a central opening in the upper end wall.

The cutting and die-forming process may be performed radially inwardly or radially outwardly. Namely, in the former case, a plurality of circumferentially spaced small diameter portions are radially inwardly deformed from the original cylindrical portion and separated therefrom along axially extending cut lines, and the inner circumferential surfaces of the small diameter portions define valve guiding surfaces. In the latter case, a plurality of circumferentially spaced large diameter portions are radially outwardly deformed from the original cylindrical portion and separated therefrom along axially extending cut lines, and the inner circumference of the original cylindrical portion define valve guiding surfaces.

BRIEF DESCRIPTION OF THE DRAWINGS

Further objects and advantages of the invention will become apparent from the following detailed description taken in conjunction with the attached drawings, in which:

FIGS. 8A through 8K are schematic views illustrating a process for manufacturing the valve guide according to the invention;

FIG. 11C through FIG. 11J are views showing an alternative process for manufacturing the valve guide according to the invention;

DETAILED DESCRIPTION OF THE PREFERRED EMBODIMENT

Figure 1:
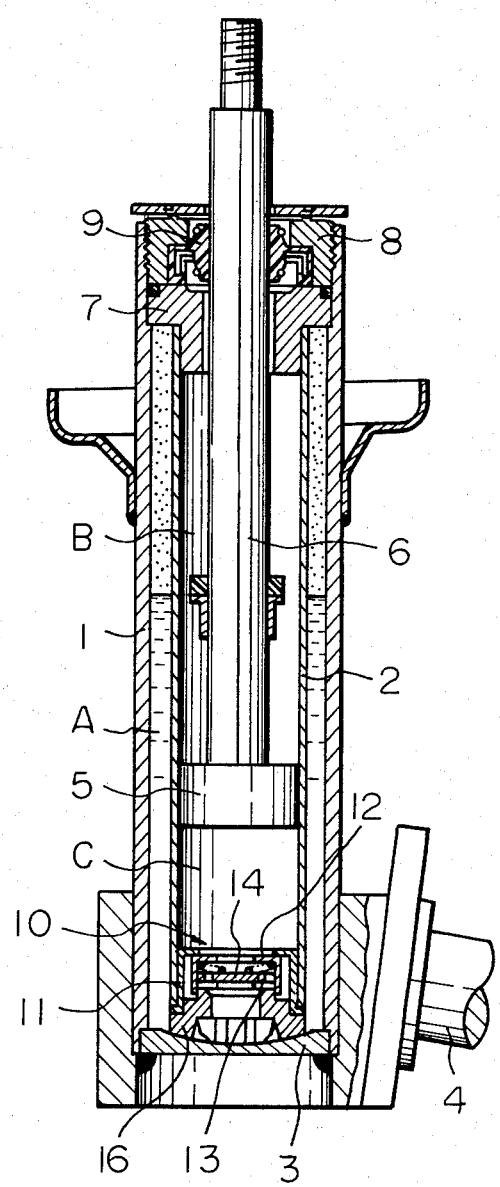
FIG. 1 is a longitudinal sectional view of a prior art hydraulic damper.

FIGS. 1-4 show one prior art hydraulic damper comprising a tubular main body 1, a cylinder 2 coaxially disposed in the main body 1, a bottom cap 3 closing the lower end of the main body 1, a piston 5 slidably disposed in the cylinder 2 and partitioning the interior of the cylinder 2 into first and second oil chambers B C, and a piston rod 6 secured to the piston 5 and extending through the first oil chamber B, a rod guide 7, and a seal 9 to the outside. The main body 1 and the cylinder 2 define therebetween an annular space A receiving therein gas and oil and acting as a reservoir chamber. A knuckle spindle 4 for mounting a wheel (not shown) thereon is secured to the lower end portion of the main body 1, and the projecting end of the piston rod 6 is connected to a body of a vehicle (not shown).

Figure 2:
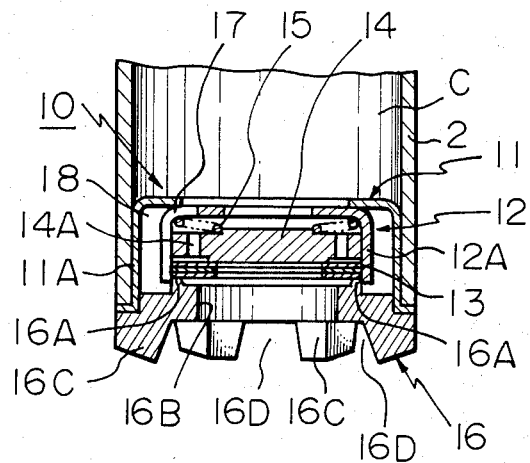
FIG. 2 is an enlarged partial view of FIG. 1.
Figure 3:
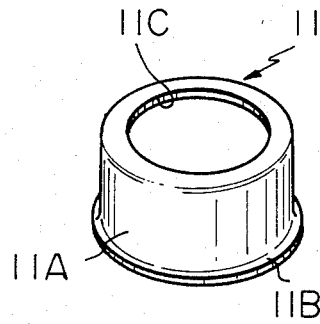
FIG. 3 is a perspective view of a retainer incorporated in FIG. 2.
Figure 4:
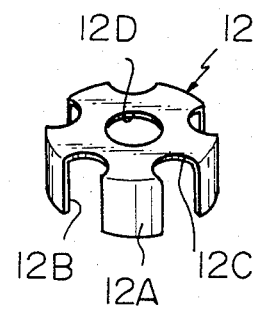
FIG. 4 is a perspective view of a valve guide incorporated in FIG. 2.

There is provided on the lower end of the cylinder 2 and between the chambers C and A a damping force generating mechanism 10 for generating the damping force in the contraction stroke of the damper. The damping force in the extension stroke of the damper is generated by a mechanism (not shown) mounted on the piston 5. FIG. 2 shows details of the mechanism 10. The mechanism 10 includes a retainer 11 (FIG. 3), a valve guide 12 (FIG. 4), an annular valve disc 13, a circular retainer 14 having a plurality of axial holes 14A, a spring 15 extending between the retainer 14 and the valve guide 12, and a bottom member 16 defining thereon a valve seat 16A. The retainer 11 has a tubular portion 11A fitted on the inner circumference of the cylinder 2, a radial flange 11B clamped between the lower end of the cylinder 2 and the bottom member 16, and an upper end surface having formed therein an axial opening 11C. The valve guide 12 has a plurality of axially extending and circumferentially spaced leg portions 12A defining therebetween radial passages 12B, and an upper end surface having formed therein an axial opening 12D. The leg portions 12A extend respectively to the upper end surface of the valve guide and define therebetween passages 12C. In the assembled condition the opening 11C and the passages 12C cooperate to define passages 17, and an annular space 18 is formed between the inner circumference of the tubular portion 11A and the passages 12B. The radially inner surfaces of the leg portions 12A guide the disc 13 and the retainer 14. The retainer 14 has on the lower surface a stepped portion for coperating with the inner circumferential portion of the valve disc 13 to act as a valve seat. The bottom member 16 has an axial passage 16B, and a plurality of legs 16C defining therebetween passages 16D communicating permanently with the chamber A.

In the extension stroke of the damper, the oil in the chamber B flows into the chamber C through the mechanism mounted on the piston 5, and which mechanism generates a predetermined damping force. At that time, an amount of the oil corresponding to the volume of the rod 6 leaving the cylinder 2 flows from the chamber A to the chamber C by lifting the valve disc 13 and the retainer 14 against the force of the spring 15. The oil flowing radially outwardly through the space between the valve seat 16A and the valve disc 13 flows into the space 18 and, thereafter, flows into the chamber C through the passages 17.

In the contraction stroke of the damper, a part of the oil in the chamber C flows into the chamber B through the mechanism on the piston 5 without generating any substantial damping force. A part of the oil in the chamber C corresponding the volume of the piston rod 6 entering the cylinder 2 flows through the mechanism 10 to the chamber A and generates a predetermined damping force. The oil flows through openings 11C and 12C and through axial holes 14A and acts on the valve disc 13 and deflects downwards the inner circumference of the valve disc 13 to separate from the retainer 14. The oil flows into the chamber A through passages 16B and 16D and generates a predetermined damping force.

The prior art hydraulic damper having the aforesaid constitution has the following shortcomings. Firstly, in the extension stroke and when the oil in the chamber A flows through the mechanism 10 to the chamber C, the retainer 14 and the valve disc 13 are moved upward against the spring force of the spring 15 whereby the oil flowing through the mechanism 10 flows solely through passages 17. The sectional area of the passages 17 cannot be sufficiently large and, therefore, when the diameter of the piston rod 6 is large and when the reciprocating speed of the piston is high, the valve mechanism 10 also generates a damping force, thereby causing adverse effects on the damping force characteristics. Secondly, the retainer 11 and the valve guide 12 are separate parts, which increases the number of parts and complicates the manufacturing and assembling process.

Figure 5:
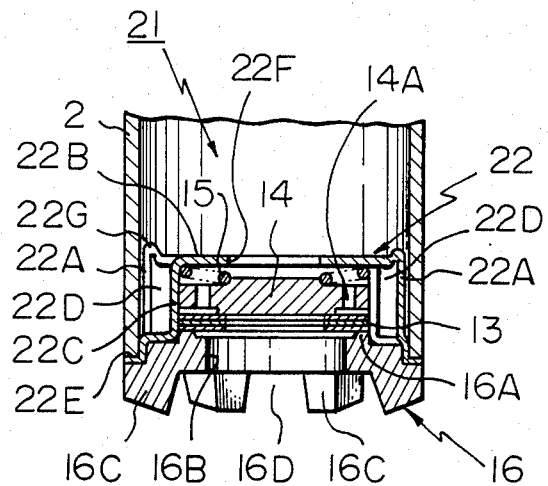
FIG. 5 is a partial sectional view of a hydraulic damper made according to the invention and is generally similar to FIG. 2.
Figure 6:
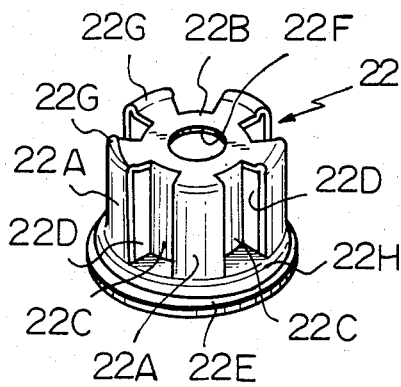
FIG. 6 is a perspective view of a valve guide made according to the invention.

The present invention avoids the shortcomings aforementioned, and a preferred embodiment of the invention is shown in FIGS. 5 and 6.

Figure 7:
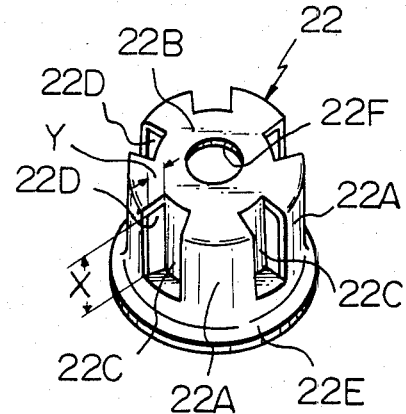
FIG. 7 is a perspective view of a modified form of valve guide.

FIG. 5 is generally similar to FIG. 2 with parts corresponding to FIG. 2 being depicted by the same reference numerals. The retainer 11 and the valve guide 12 in FIG. 2 are replaced by a novel valve guide 22 according to the invention. The valve guide 22 has a plurality of circumferentially spaced and axially extending large diameter portions 22A, a plurality of circumferentially spaced and axially extending small diameter portions 22C, a generally flat top wall 22B connected to the upper ends of respective large diameter portions 22A and to the upper ends of respective small diameter portions 22C, a central opening 22F formed in the top wall 22B, a radially outwardly extending flange 22E connected to the lower ends of the large and small diameter portions 22A and 22C and being clamped between the lower end of the cylinder 2 and the bottom member 16. The large and small diameter portions 22A and 22C define therebetween openings 22D which are formed respectively along axially extending cut lines and which have respectively an axial length X and a radial width Y (FIG. 7). The inner circumference of the small diameter portions 22C define guiding surfaces for the valve disc 13 and the retainer 14. Further, an axially projecting ridge or bent portion 22G is formed between the top wall 22B and each of the large diameter portions 22A to increase the strength or rigidity of the valve guide 22. The valve guide 22 can be formed of a material such as sheet metal by press-forming process.

In the assembled condition shown in FIG. 5, there are provided between the inner circumference of the cylinder 2 and respective small diameter portions 22C a plurality of axially extending passages directly opening to the oil chamber C, and which passages are connected through openings 22D to a plurality of axially extending passages which are defined between the inner circumference of respective large diameter portions 22A and the outer circumference of the disc 13 and the retainer 14. Therefore, the oil flow passing through the valve disc 13 does not receive any substantial restriction in passing through the valve guide 22.

FIG. 7 shows another embodiment of the invention wherein the ridges or projecting portions 22G are omitted, thereby simplifying the manufacturing process.

Two preferred methods for manufacturing the valve guide 22 according to the invention will hereinafter described.

Figure 8A:
Figure 8B:
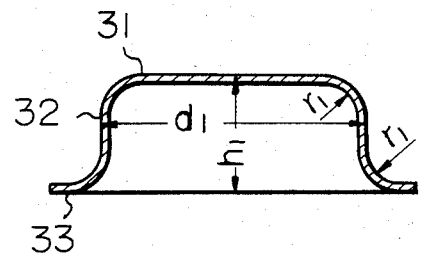
Figure 8C:
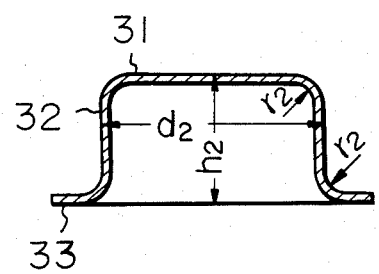
Figure 8D:
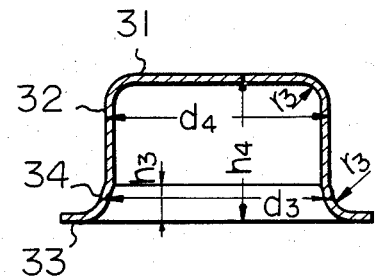
Figure 8E:
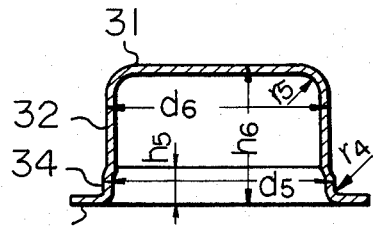

FIGS. 8A through 8K show a manufacturing process. Firstly, a circular sheet metal member 30 (FIG. 8A) is stamped or drawn into a generally hat shaped configuration having a top wall 31, a cylindrical wall 32 and a bottom flange 33 as shown in FIG. 8B. In a second step shown in FIG. 8C the diameter $d_2$ and the radius $r_2$ are reduced and the height $h_2$ is increased as compared with FIG. 8B. In the third drawing or reducing step shown in FIG. 8D, a stepped portion 34 is formed on the lower end of the cylindrical wall 32. The diameter $d_4$ is nearly equal to the diameter $d_2$, and the diameter $d_3$ and the height $h_4$ are larger than the diameter $d_2$ and the height $h_2$, respectively. By the fourth drawing step, the radius $r_4$ is reduced to the minimum as shown in FIG. 8E. The height $h_6$ is smaller than the height $h_4$. In the illustrated embodiment, the stamping or drawing steps are divided into four steps which ensures a substantially uniform thickness of the article of FIG. 8E, however, the article may be formed by three or less steps according to the desired configuration of the article and the characteristics of the material.

Figure 8F:
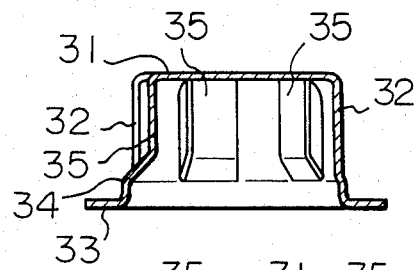
Figure 8G:
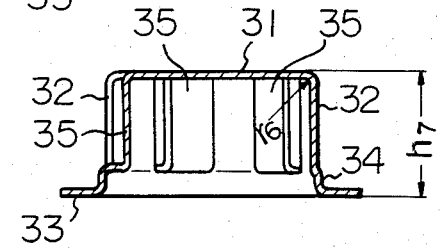
Figure 9A:
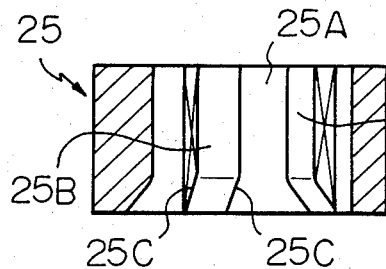
FIG. 9A is a sectional view of a first die utilized to perform the process shown in FIG. 8F.
Figure 10A:
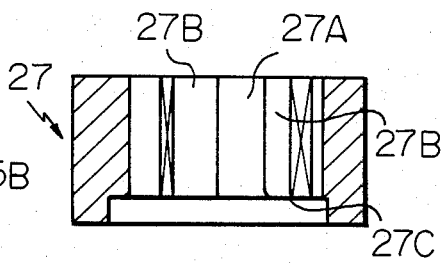
FIG. 10A is a sectional view of a second die to perform the process shown in FIG. 8G.
Figure 9B:
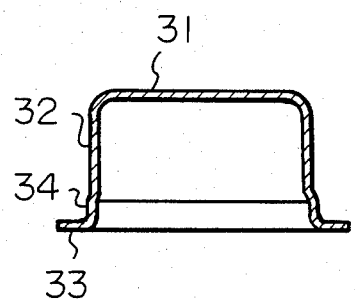
FIG. 9B is a view similar to FIG. 8E.
Figure 10B:
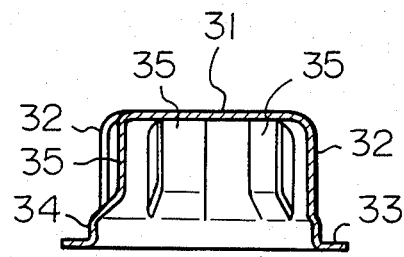
FIG. 10B is a view similar to FIG. 8F.
Figure 9C:
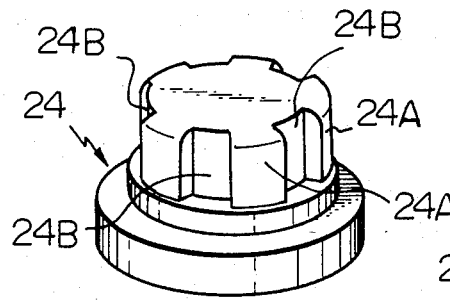
FIG. 9C is a perspective view of a punch cooperating with the die of FIG. 9A.
Figure 10C:
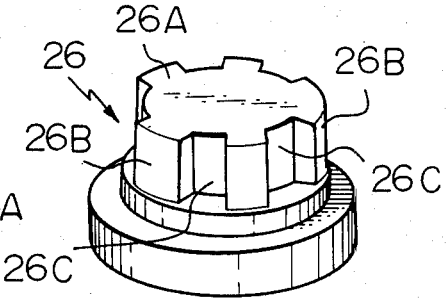
FIG. 10C is a perspective view of a punch cooperating with the die of FIG. 10A.

FIGS. 8F and 8G show cutting and die-forming operations. Firstly, a punch 24 (FIG. 9C) and a die 25 (FIG. 9A) are utilized. The punch 24 has an outer configuration snugly fitting within the article of FIG. 9B (which is similar to FIG. 8E) and has a plurality of axially extending and circumferentially spaced grooves 24B between cylindrical portions 24A. The die 25 has a plurality of axially extending and circumferentially spaced wall portions 25A adapted to cooperate with the cylindrical wall portions 24A to clamp therebetween respective wall portions of the article. The die 25 further has a plurality of axially extending and circumferentially spaced projections 25B projecting radially inwardly from the wall portions 25A. There are provided cutting edges 25C on the circumferentially opposite sides of the lowr end portion of each of the projections 25B, and the cutting edges 25C incline radially outwardly and downwardly. Thus, when the punch 24 having fitted thereon the article of FIG. 9B is pressingly fitted in the die 25, portions of top wall 31 and the cylindrical wall 32 are cut along axially extending cut lines, and portions defined between adjacent two cut lines and corresponding to the projections 25B of the die 25 are deformed radially inwardly and downwardly to define small diameter portions 22C of FIG. 6, and the article takes the form of FIG. 8F. In the second step of the cutting and die-forming process, a punch 26 and a die 27 shown in FIGS. 10C and 10A are utilized. The punch 26 may substantially be similar to the punch 24 but, preferably, the radius of the corner portions is smaller than of the punch 24. The die 27 is nearly similar to the die 25 but the cutting edges 25C are omitted. FIG. 8G shows the article formed by this step.

Figure 8H:
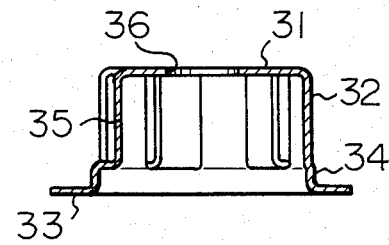

Thereafter a central opening 36 corresponding to the opening 22F in FIG. 6 is formed by a punching process as shown in FIG. 8H.

Figure 8J:
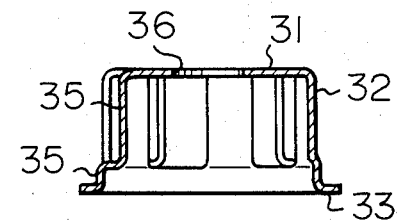

FIG. 8J shows a process for trimming the outer diameter of the flange 33 to conform with the flange 22E of FIG. 6.

Figure 8K:
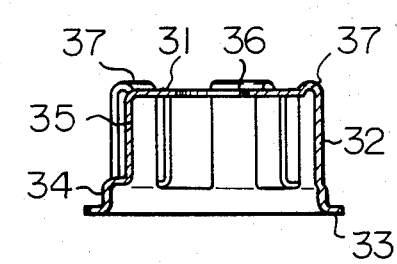

FIG. 8K shows a step for forming ridges or projections 37 on the top wall 31, and the projections 37 correspond to the projections 22G on the valve guide 22 in FIG. 6.

In the illustrated embodiment, the stepped portion 34 has been formed by the third drawing step, and the stepped portion 34 corresponds to the stepped portion 22H in FIG. 6 for fitting with the inner circumference of the cylinder 2. The stepped portion 22H simplifies the assembling process and ensures the axial alignment between the cylinder 2 and the valve guide 22. However, the stepped portion 22H may be omitted with the outer circumference of the large diameter portions 22A fitting with the cylinder 2. In such case, the third drawing process may be omitted.

In the aforesaid method, the cutting and die-forming steps are performed in a radially inward direction, however, such steps may be performed in radially outward direction.

FIG. 11C through FIG. 11J show the process and FIGS. 12A, 12C, 13A and 13C show dies and punches utilized.

Figure 11C:
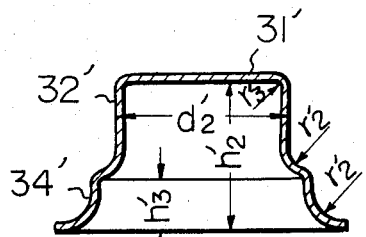

FIG. 11C corresponds to FIG. 8C wherein the generally hat-shaped article has a small diameter cylindrical wall 32' and a large diameter cylindrical wall 34'. The large diameter cylindrical wall 34' is adapted to form the stepped portion 22H in FIG. 6, and the small diameter wall 32' is adapted to form the small diameter portions 22C in FIG. 6.

Figure 11D:
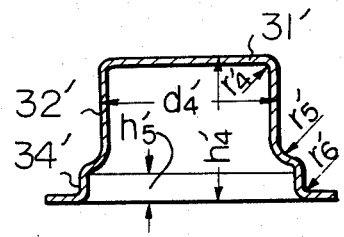
Figure 11E:
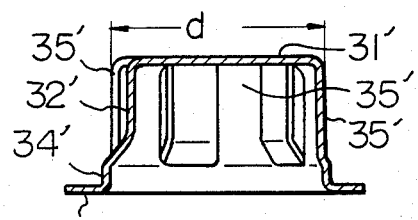
Figure 11F:
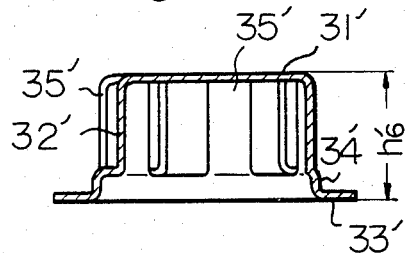
Figure 12A:
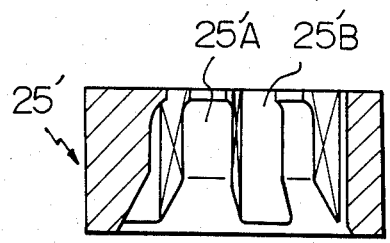
FIGS. 12A and 12C show a die and a punch for performing the process between FIGS. 11D and 11E.
Figure 13A:
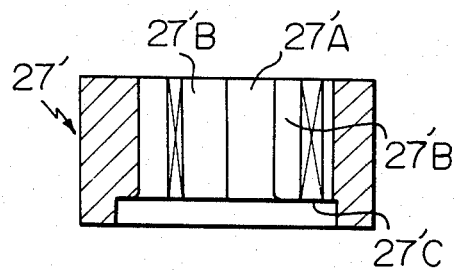
FIG. 13A is a sectional view of a die.
Figure 12B:
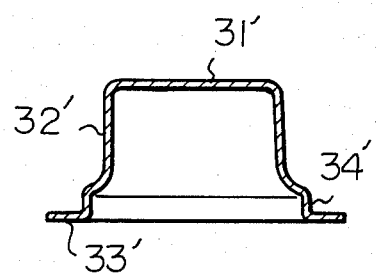
FIG. 12B is a view similar to FIG. 11D.
Figure 13B:
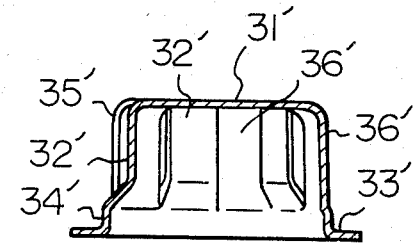
FIG. 13B is a view similar to FIG. 11E.
Figure 12C:
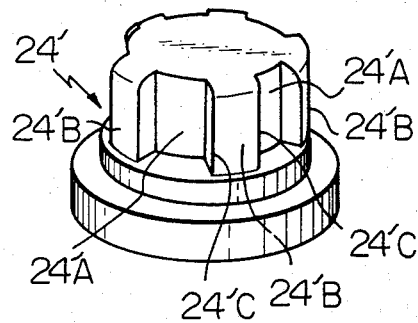
Figure 13C:
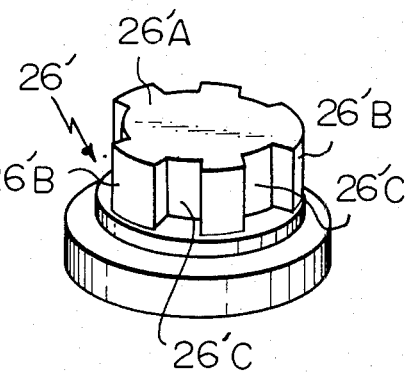
FIG. 13C is a perspective view of a punch.

The article shown in FIG. 11D which has been formed by the third step of drawing process (the article formed by the first step of the drawing process is similar to FIG. 8B and is not shown), is cut and die-formed by utilizing a punch 24' and a die 25' shown in FIGS. 12C and 12A. The die 25' has on the inner circumference thereof a plurality of axially extending and circumferentially spaced surface portions 25'A for snugly receiving the article of FIG. 12B or FIG. 11D and a plurality of axially extending and circumferentially spaced grooves or surface portions 25'B for engaging with cut and radially outwardly deformed portions. The cutting and radially outwardly deforming step is performed by pressingly inserting the punch 24' into the article received in the die 25'. The punch 24' has a plurality of axially extending and circumferentially spaced surface portions 24'A corresponding to the inner surface of the article of FIG. 12B and a plurality of axially extending and circumferentially spaced surface portions 24'B defining on the opposite circumferential edges cutting edges 24'C. The article formed by this step is shown in FIG. 11E or in FIG. 13B.

Thereafter, the punch 26' and the die 27' are utilized to effect the last step of the cutting and die-forming process.

Figure 11G:
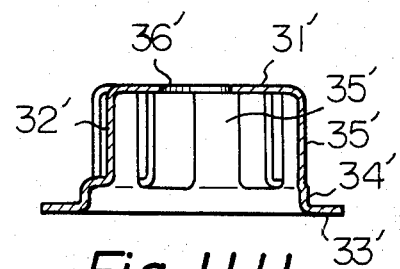
Figure 11H:
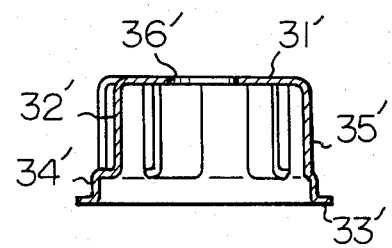
Figure 11J:
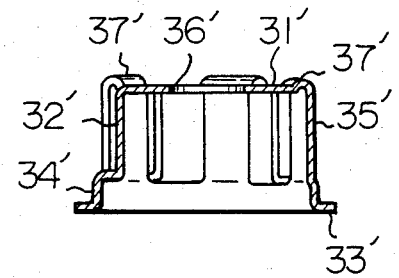

Further steps shown in FIGS. 11G, 11H and 11J are similar respectively to heretofore explained steps with respect to FIGS. 8H, 8J and 8K.

The method is advantageous over the first mentioned method in that it is possible to obtain smooth arcuate surfaces on the small diameter portions as compared with the first method, thereby improving movement of the valve disc 13 and the retainer 14.

As described heretofore in detail, the valve guide formed according to the invention provides a sufficient passage area for the oil flow passing through the valve mechanism. Thus, it is possible to supply oil liquid sufficiently to the oil chamber C in the extension stroke of the damper, and it is possible to obtain a desired damping force characteristic in the contraction stroke of the damper.

Further, the valve guide is a unitary member, and thus, it is possible to reduce the number of parts, to minimize the manufacturing cost, and to simplify the assembling process.

Further, the valve guide is formed by press work operations, and the cutting and die-forming process aforementioned can minimize the amount of scrap, thereby improving efficiency of utilization of the raw material.

What is claimed is:

1. A method for manufacturing a valve guide for use in a hydraulic damper of the type including a cylinder, a piston slidably disposed in said cylinder and partitioning the interior of said cylinder into first and second oil chambers, a rod secured to said piston and extending through said first chamber to the outside, a damping force generating valve mechanism provided in said cylinder and at one end of said second oil chamber, said valve mechanism having a bottom member defining an annular valve seat thereon, a flexible valve disc cooperating with said valve seat, and a generally tubular said valve guide having a plurality of axially extending large and small diameter portions being formed integrally and alternately along the circumference thereof, said large and small diameter portions defining therebetween radially and axially extending cutouts which act as oil passages, said method comprising:

stamping or drawing a sheet metal member into a generally hat shaped configuration having an upper end wall, a cylindrical wall and a flange extending radially outwards from the lower end of said cylindrical wall;

cutting and die-forming a plurality of circumferentially spaced portions of said upper end wall and said cylindrical wall to form a plurality of circumferentially spaced small diameter cylindrical portions and a plurality of cut-outs defined between said small diameter cylindrical portions and remaining portions of said cylindrical wall; and punching a central opening in the upper end wall.

2. A method for manufacturing a valve guide for use in a hydraulic damper of the type including a cylinder, a piston slidably disposed in said cylinder and partitioning the interior of said cylinder into first and second oil chambers, a rod secured to said piston and extending through said first chamber to the outside, a damping force generating valve mechanism provided in said cylinder and at one end of said second oil chamber, said valve mechanism having a bottom member defining an annular valve seat thereon, a flexible valve disc cooperating with said valve seat, and a generally tubular said valve guide having a plurality of axially extending large and small diameter portions being formed integrally and alternately along the circumference thereof, said large and small diameter portions defining therebetween radially and axially extending cutouts which act as oil passages, said method comprising:

stamping or drawing a sheet metal member into a generally hat shaped configuration having an upper end wall, large and small diameter cylindrical walls defining therebetween a radial step and a flange extending radially outwards from the lower end of the large diameter wall;

cutting and die-forming a plurality of circumferentially spaced portions of said small diameter cylindrical wall and said radial step to form a plurality of circumferentially spaced large diameter cylindrical wall portions the diameter of which is substantially equal to said large diameter wall, and a plurality of cut-outs defined between said large diameter portions and remaining portions of said small diameter wall; and punching a central opening in the upper end wall.

* * * * *